(12) United States Patent
Keiser

(10) Patent No.: US 7,387,316 B2
(45) Date of Patent: Jun. 17, 2008

(54) PORTABLE WATER TANK

(75) Inventor: Keril M. Keiser, Phelan, CA (US)

(73) Assignee: Bobby J. Kelley, Hesperia, CA (US)

( * ) Notice: Subject to any disclaimer, the term of this patent is extended or adjusted under 35 U.S.C. 154(b) by 679 days.

(21) Appl. No.: 11/105,012

(22) Filed: Apr. 12, 2005

(65) Prior Publication Data

US 2005/0236806 A1 Oct. 27, 2005

Related U.S. Application Data

(60) Provisional application No. 60/564,693, filed on Apr. 22, 2004.

(51) Int. Cl.
- B60P 3/22 (2006.01)
- B60D 1/54 (2006.01)
- B60S 9/00 (2006.01)
- E01H 3/02 (2006.01)

(52) U.S. Cl. ............... 280/839; 280/491.3; 280/491.4; 280/186; 280/189; 280/762; 280/763.1; 280/764.1; 280/765.1; 280/766.1; 137/899.3; 137/351; 137/899; 137/343

(58) Field of Classification Search ............... 137/344, 137/351, 899, 343, 899.3; 280/186, 189, 280/762, 763.1, 764.1, 765.1, 766.1, 491.3, 280/491.4, 839

See application file for complete search history.

(56) References Cited

U.S. PATENT DOCUMENTS

| | | | | | |
|---|---|---|---|---|---|
| 1,509,030 | A | * | 9/1924 | Roy | 180/6.7 |
| 3,407,836 | A | * | 10/1968 | Keiser | 137/899.3 |
| 3,574,388 | A | * | 4/1971 | Stone | 296/168 |
| 3,809,115 | A | * | 5/1974 | Klein | 137/353 |
| 3,912,293 | A | * | 10/1975 | Harbers | 280/81.1 |
| 3,973,754 | A | * | 8/1976 | Chadwick, Jr. | 254/323 |
| 4,041,974 | A | | 8/1977 | Keiser | |
| 4,274,795 | A | * | 6/1981 | Taylor | 414/673 |
| 4,449,724 | A | * | 5/1984 | Ahn | 280/837 |
| 4,482,287 | A | * | 11/1984 | Menzi | 414/694 |
| 4,747,457 | A | * | 5/1988 | Buscaiolo et al. | 180/19.1 |
| 6,199,910 | B1 | * | 3/2001 | Wade | 280/837 |
| 6,257,272 | B1 | * | 7/2001 | Keiser | 137/343 |

* cited by examiner

Primary Examiner—Christoher Ellis
Assistant Examiner—John R Olszewski
(74) Attorney, Agent, or Firm—Boniard I. Brown

(57) ABSTRACT

A portable tank apparatus has a yoke pivotal on a transverse member between a service towing position and a raised position, and a pair of hingedly connected brace members at the rear of the apparatus and operable by an actuator to retract the wheels or lower the wheels to the ground.

26 Claims, 6 Drawing Sheets

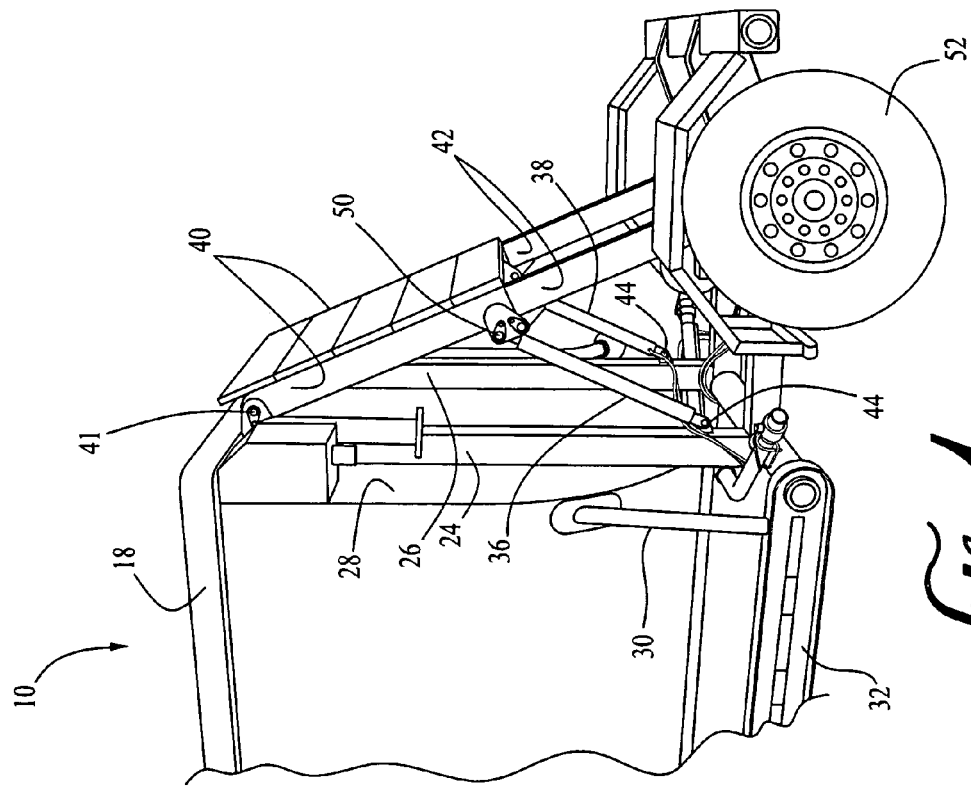
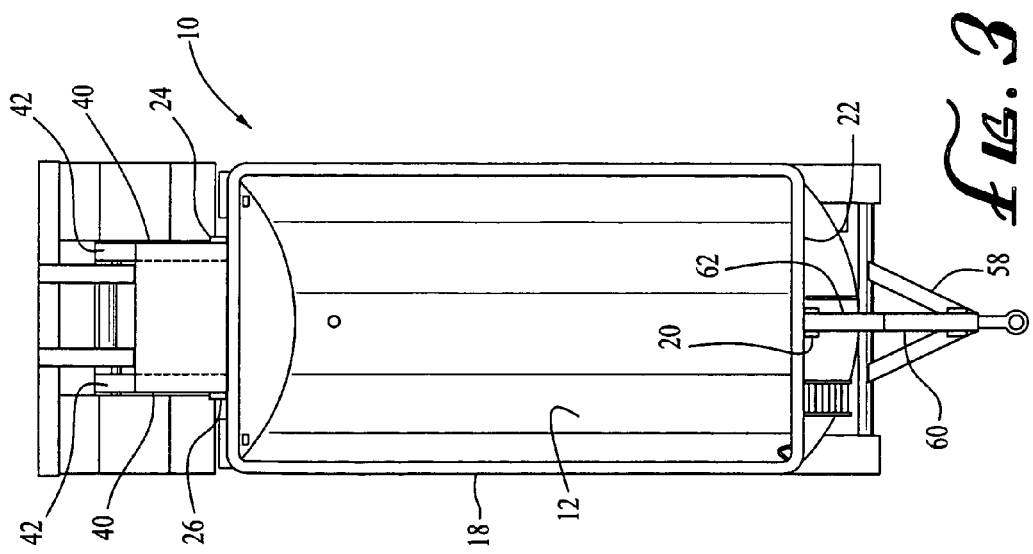

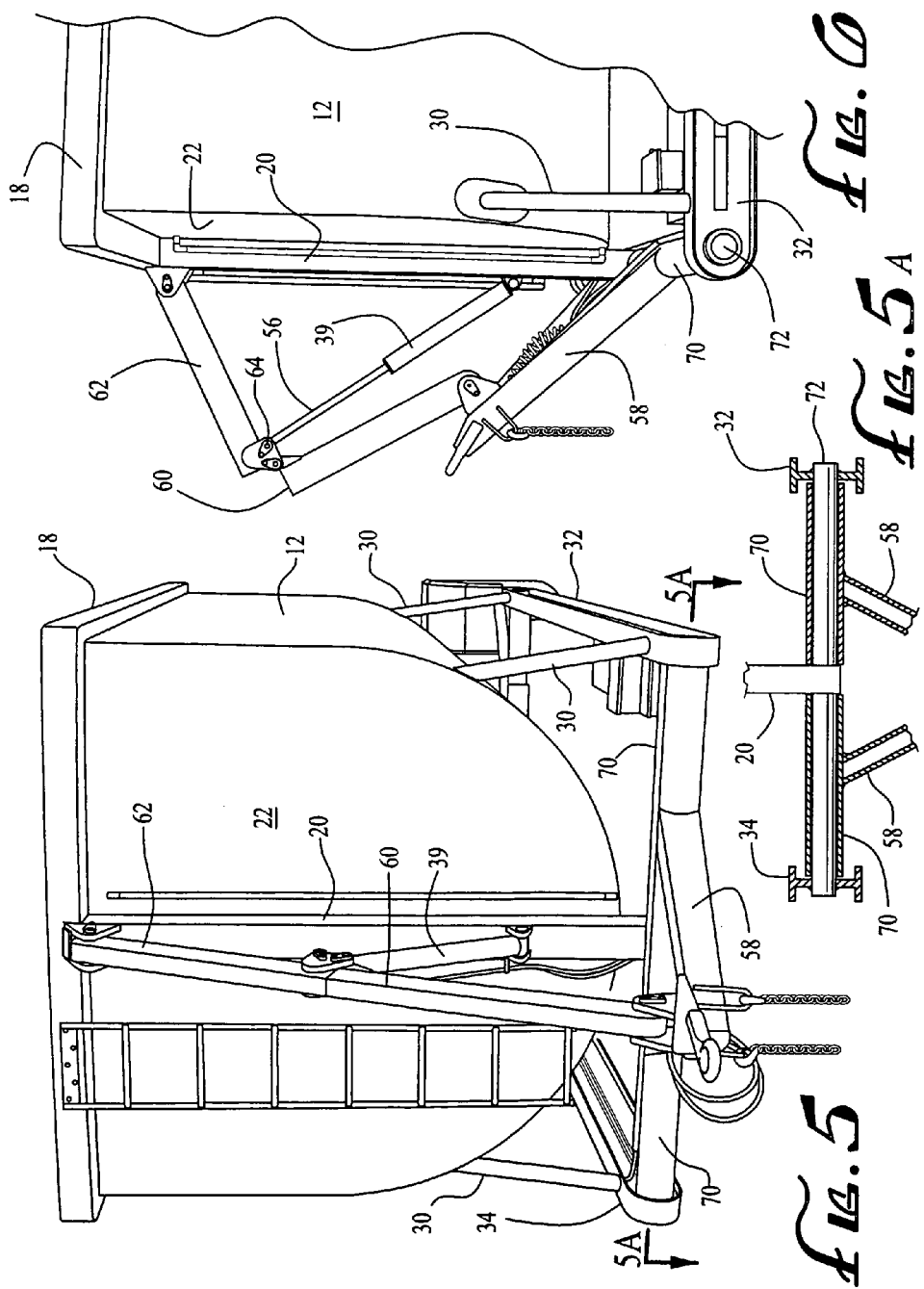

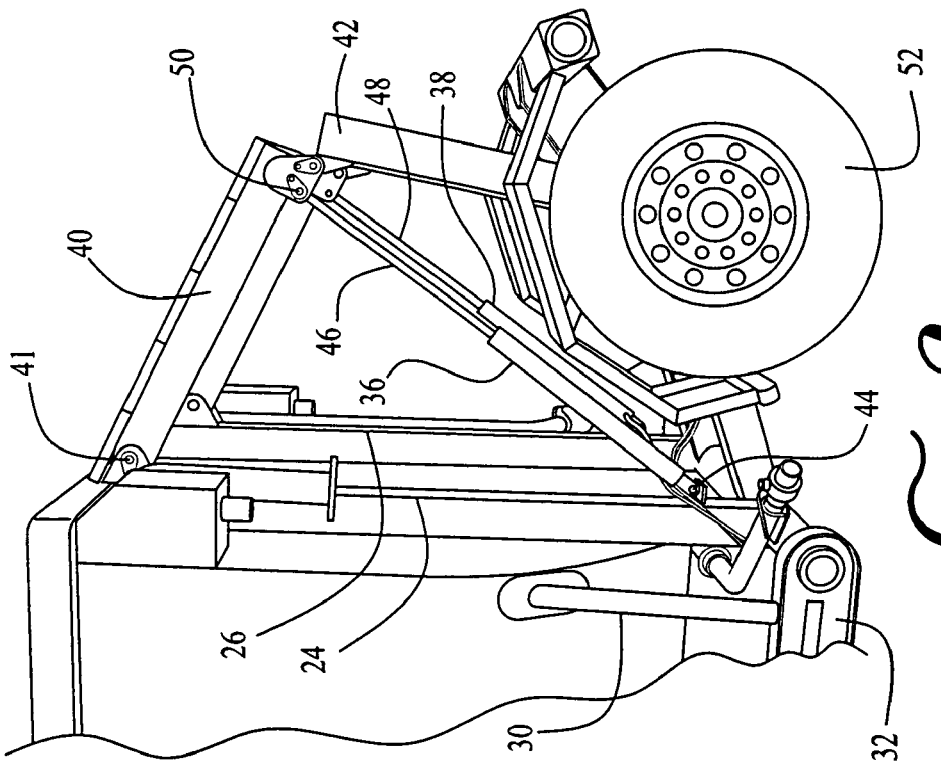
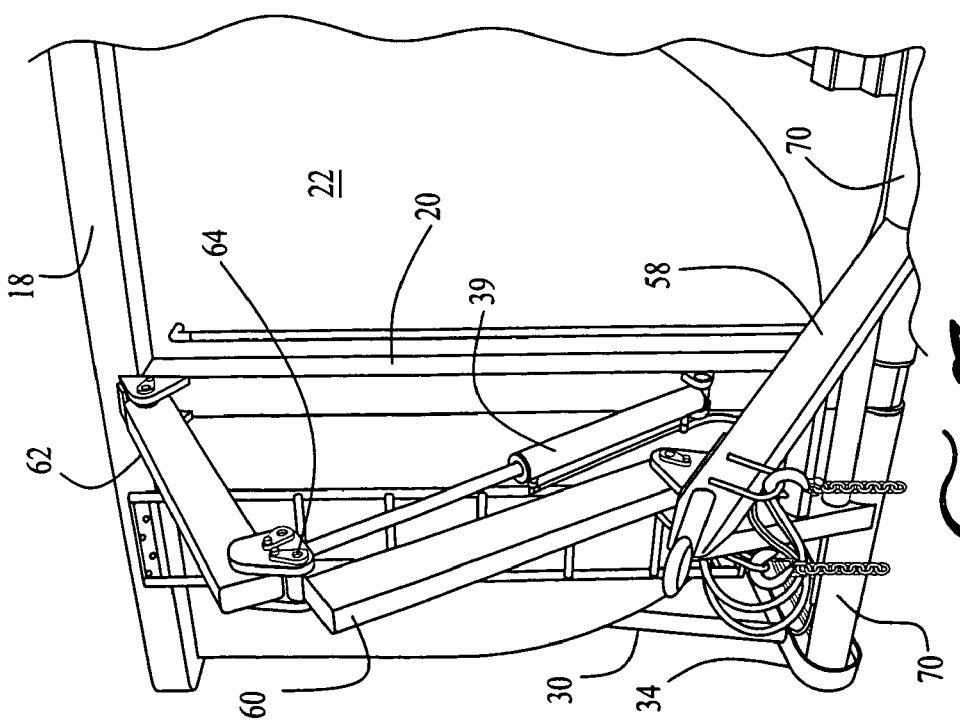

PORTABLE WATER TANK

RELATED APPLICATIONS

Reference is made to my Provisional Application No. 60/564,693, filed Apr. 22, 2004, entitled Portable Water Tank.

BACKGROUND AND SUMMARY OF THE INVENTION

The tank apparatus of the present invention is typically utilized in the fighting of forest fires and other large fires.

In fighting such fires, portable water tanks are often utilized, and helicopters and other aircraft may often be employed. These aircraft may typically be capable of scooping water from a body or tank of water and depositing it on a fire. A helicopter or other aircraft may suspend a container to dip water from bodies of water or tanks for dropping on a fire area.

The present invention relates to a portable and towable tank assembly for movement to a forest fire or other fire are for quick positioning in a fire area utilizing any source of water available, such as a hydrant or a body of water.

The portable tank apparatus comprises a body, beam members disposed along each side of the tank body to support it on the ground. A yoke at the front of the apparatus is rotatable between a raised position and a lowered towing position. A brace member is pivotal on an upper portion of the tank and another brace member is hingedly connected therewith and with the yoke for movement to raise and lower the yoke by acting at the hinged connection between the brace members.

Another pair of brace members are hingedly connected, a first one at the rear of the tank and the other connected therewith and carrying rotatable ground wheels maintained extended by the braces when aligned.

BRIEF DESCRIPTION OF THE DRAWINGS

FIG. 3 is a top view of the tank apparatus of FIGS. 1 and 2;

FIG. 4 is a perspective view showing the rear portion of the apparatus of FIGS. 1-3;

FIG. 5 is a rear perspective view of the apparatus of FIGS. 2-4;

FIG. 6 is a partial perspective view of a front portion of the apparatus of FIG. 5;

FIG. 7 is a partial perspective view of the frontal portion of the apparatus of FIGS. 5 and 6;

FIG. 8 is a partial perspective view showing the tank apparatus lowered to set on the ground;

DESCRIPTION OF THE PREFERRED EMBODIMENT

Figure 1:
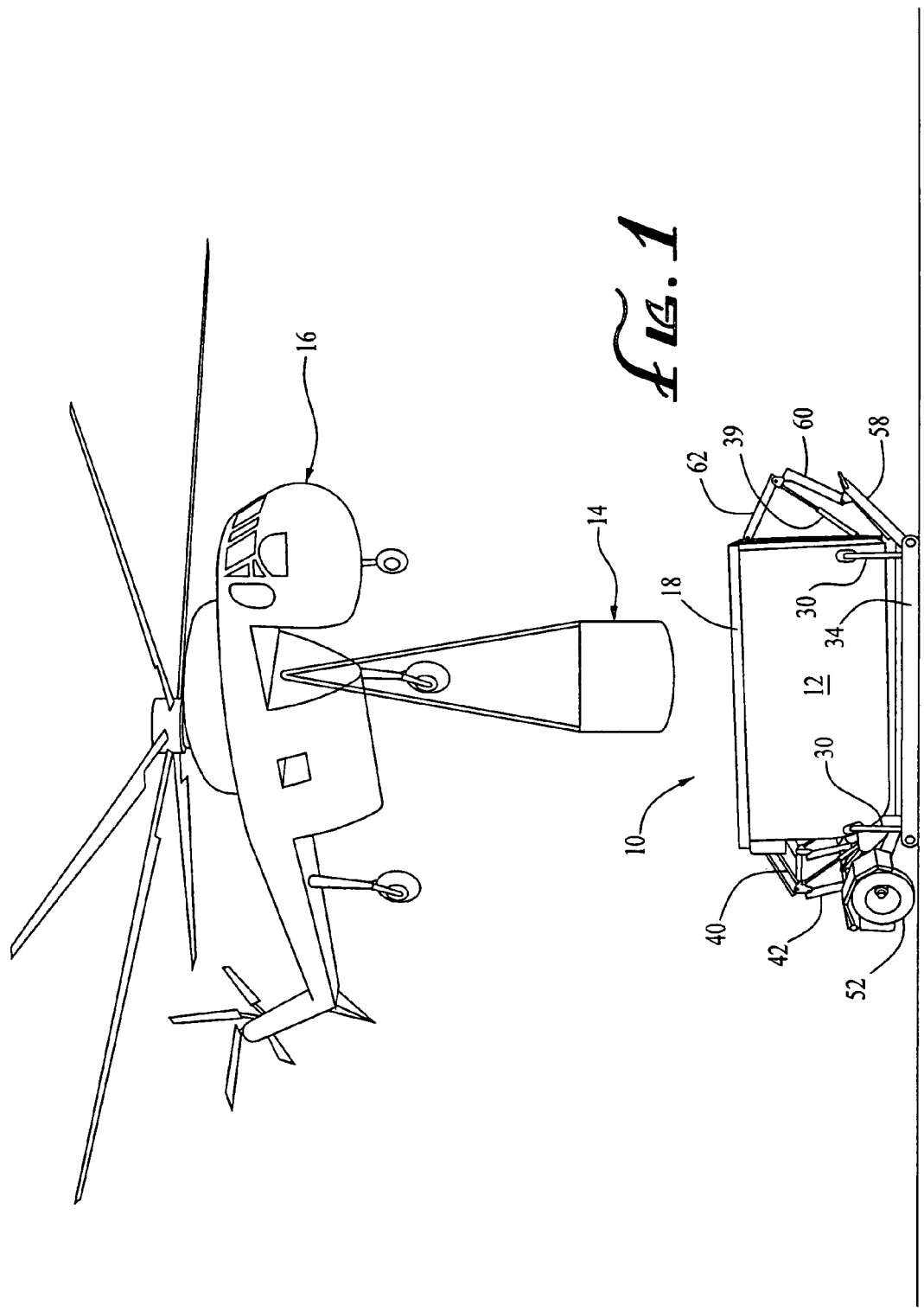
FIG. 1 is an elevational view of a tank apparatus according to the invention with a cooperating helicopter.
Figure 2:
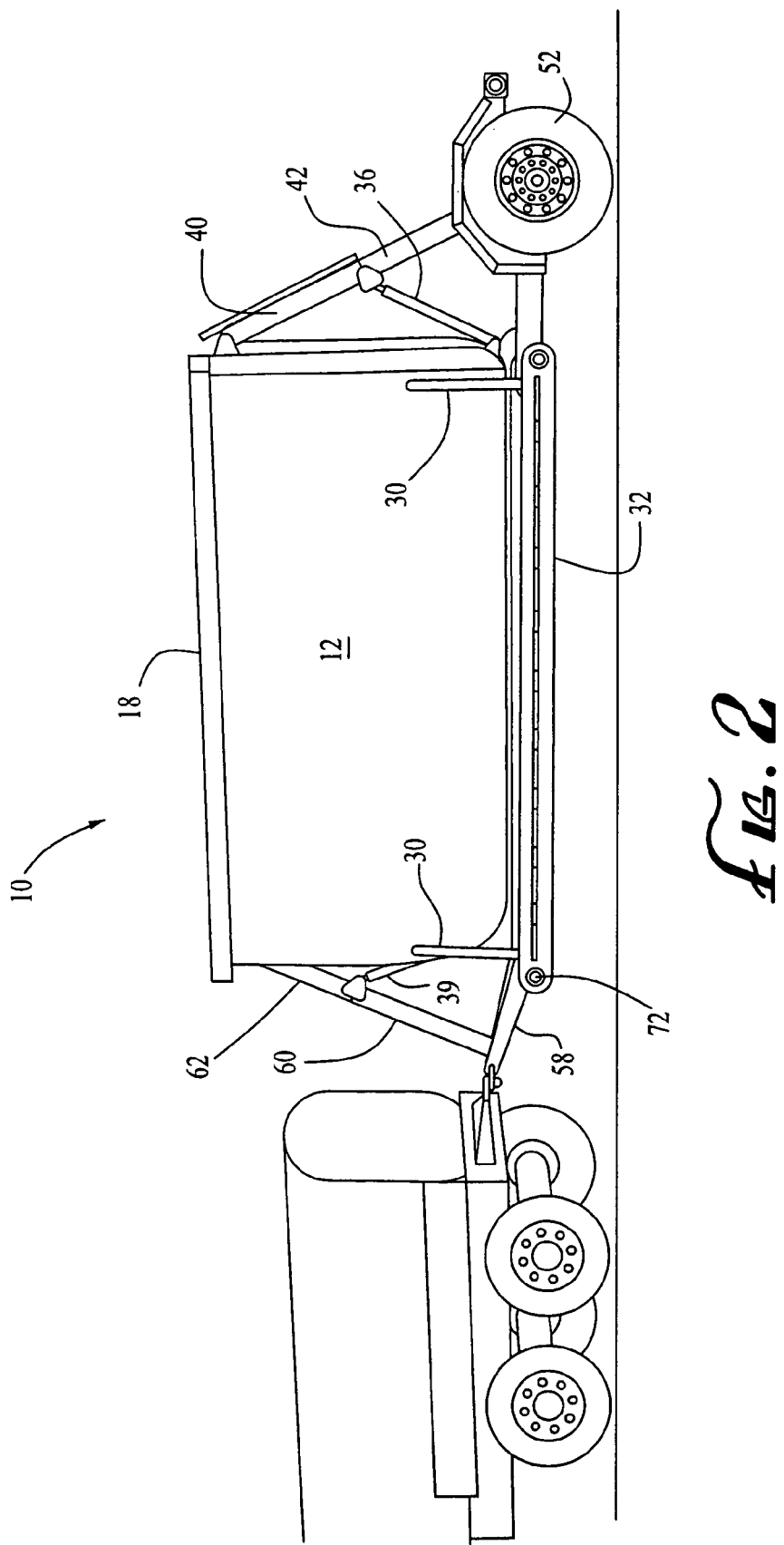
FIG. 2 is a tank apparatus according to the invention in relation to a towing vehicle.
Figure 10:
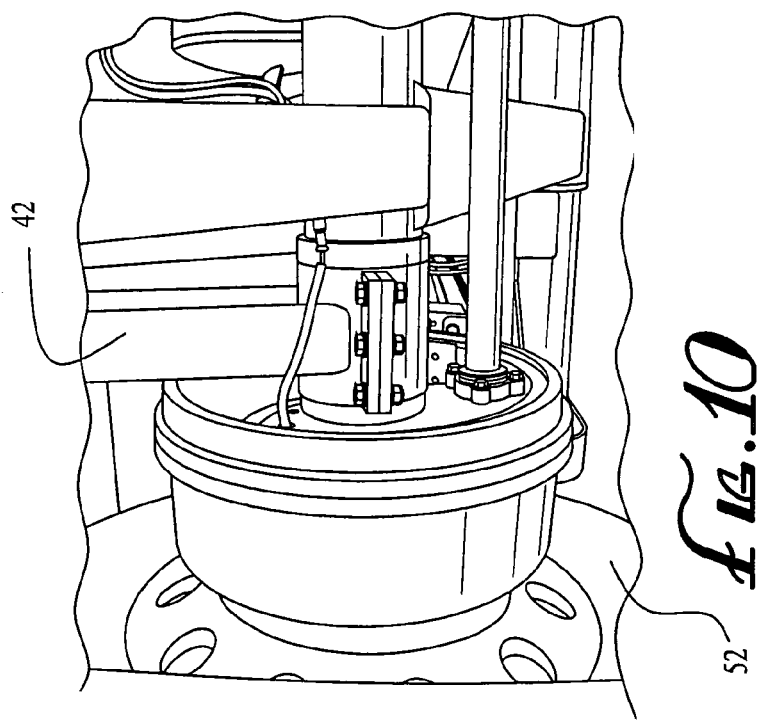
FIG. 10 is a partial perspective view of a lower rear portion of the tank apparatus.
Figure 9:
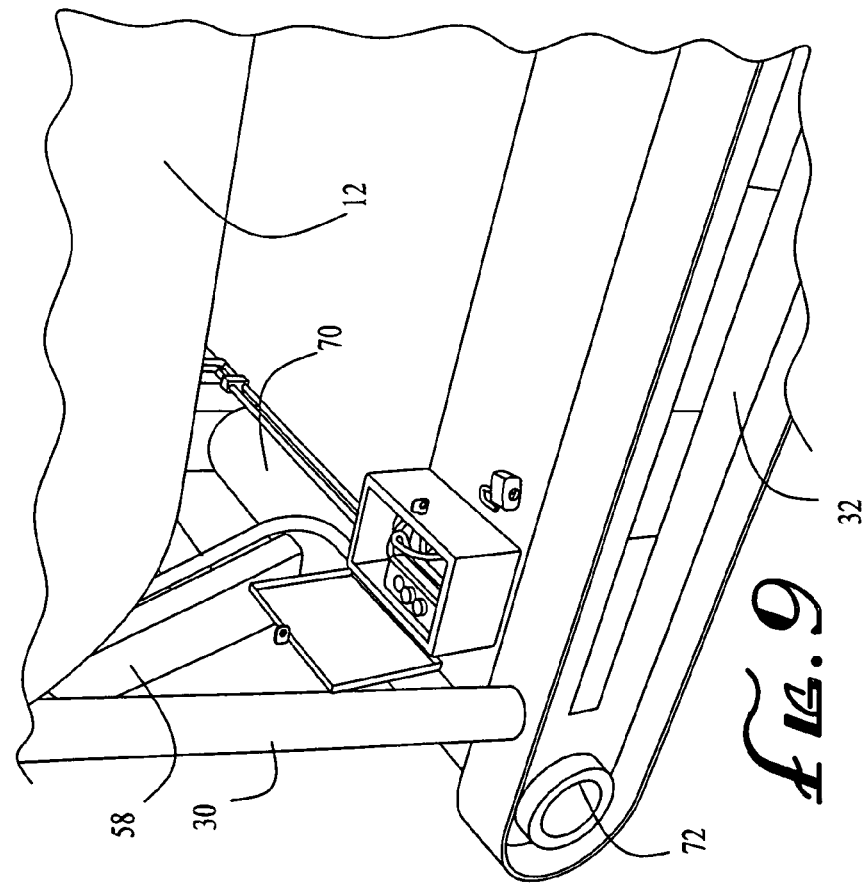
FIG. 9 is a partial perspective view of the rear portion of the tank apparatus of the invention.

Referring to the drawings, FIG. 1 shows a tank apparatus 10 according to the invention having a tank 12 from which water is removed as by dipping a container 14 suspended from a helicopter 16. The tank may typically hold 6,000 gallons of water. It is typically filled by means of a hydrant or by water pumped from a body of water, etc.

Secured as by welding about the upper edge portion of the tank is a heavy hollow steel tubing 18 which provides strong reinforcement for the top portion of the tank 12. The tubing and upper portion of the tank are supported primarily by strong supporting reinforcement beams, beam 20 being secured as by welding to the front wall 22 of the tank, and two similar heavy reinforcement beams 24, 26 being secured as by welding to the rear wall 28 of the tank. Much of the weight of the tank and water therein is borne principally by these beams. Referring to FIGS. 5, 7 and 8, the beams are welded to cross-members 72 which extend transversely between longitudinal I-beams 32, 34, and which support the tank apparatus on the ground.

The tank is supported by four legs 30 which extend between their lug connections on plural portions of the tank, as shown, and are secured as by welding to the heavy I-beams 32, 34 which extend in generally parallel relation from welded connections to the tank, The I-beams support the tank on the ground when the tank is in its lower position of FIGS. 1, 7 and 8.

The raising and lowering of the tank between its lowered position of FIGS. 7 and 8 and its elevated position of FIG. 5 is effected by operation of hydraulic actuators 36, 38 at the rear of the tank apparatus, and by hydraulic actuator 39 at the front of the tank 12.

Components and features of hydraulic actuators, related connections and control devices, are well-known in the art and are therefore not herein described and illustrated in detail.

Referring to FIG. 4, at the rear of the tank braces 40, 42 are pivotally mounted at 41 relative to the tank on one heavy beam member, as shown, and at the rear axle (not shown). Hydraulic actuators 36, 38 have their lower ends pivotally mounted relative to the tank at 44, and have actuator rods 46, 48 extending therefrom with their end portions pivoted at 50, as shown. In the configuration shown, vehicle wheels 52 are raised from the ground. FIG. 4 shows the vehicle wheels resting on the ground and supporting the tank apparatus in elevated position in cooperation with actuators 39 at the front portion of the apparatus, shown in FIG. 6. The braces 40, 42 are in their retracted positions disposed at an angle to each other, thus to elevate the wheels 52 and enable the lowering of the tank apparatus to the ground to be supported by the I-beams 32, 34.

FIG. 4 shows braces 40, 42 in aligned and abutting relation, thus effecting self-locking so that accidental or inadvertent lowering or collapse of the apparatus is prevented, as when the tank is being towed.

At the front of the tank, as shown in FIG. 6, a single hydraulic actuator 39 is pivotally mounted at its connection with the tank and has a rod 56 extended outwardly pivotally connected at 64, the braces 60, 62 being pivotal relative to the same head member, as shown. With actuator rod 56 extended, the braces 60, 62 are in bent relation for the lowerint of the tank to be supported on the ground on I-beams 32, 34. The tank is thus lowered into its position of FIGS. 6 and 8 by the operation of the hydraulic actuators, two at the rear and one at the front of the apparatus.

Each of the hydraulic actuators is a double-acting actuator, pressure being applied to the opposite side of the piston to each actuator, with the pressure applied to one side being greater than the pressure applied to the opposite side of the piston. Lower pressure on one side prevents the sudden application of force and sudden movement, which might cause possible collapse of the tank apparatus. For towing and travel of the tank apparatus, the brace members are disposed in aligned abutting relation with no hydraulic pressure in the actuators.

FIG. 6 shows the front hydraulic actuator 39 extended to raise tongue or yoke 58 into its upward position. Tongue 58 is pivotal with the outer pipe 70 which is rotatable relative to a stationary inner cross member 72 and which is welded to the I-beams 32, 34 through which it extends via openings provided. Cross member 72 may typically be 5" in diameter and the outer pipe 70 may be 6" in diameter. The outer pipe 70 is rotatable with the tongue or yoke 58 to move the yoke upwardly and downwardly. The cross member 72 is mounted in openings in opposite I-beam members and is a cross-member of the frame comprising the heavy I-beam members 32, 34.

The arrangement of components shown in FIGS. 5 and 5A including an outer pipe rotatable relative to a fixed rod, pivoting arrangement, etc., enables multiple functions by a relatively simplified combination and arrangement. The rod or pipe 72, which is a cross-member of the frame, is secured between I-beam members 32, 34, as shown.

The yoke 58 is mounted on the pipe 70 to rotate therewith between its upward position of FIGS. 6 and 7 and its downward position of FIG. 5.

The relatively simplified arrangement provided by the invention eliminates or reduces component deflection, and the assembly serves essentially three functions rather than utilizing multiple structures.

It will be understood that various changes and modifications may be made from the preferred embodiment discussed above without departing from the scope of the present invention, which is established by the following claims and equivalents thereof.

The inventor claims:

1. A portable tank apparatus, comprising:
a tank body having a front, a rear and sides,
an elongate beam member disposed at each side of the tank body to support the tank body on the ground,
a transverse member extending between front portions of said beam members,
a yoke rotatable relative to the transverse member for movement between a raised position and a lowered towing position,
a pair of hingedly connected brace members, one pivotally mounted on the tank and the other hingedly connected therewith and with a yoke for pivotal movement,
pivotal actuator means at the front of the tank to raise and lower the yoke by acting on the hinged connection between the brace members to move the yoke between a raised position and a lower position for towing of the tank,
a second pair of brace members having a hinged connection therebetween, one pivotally mounted at the upper rear of the tank and the other pivotally mounted to the first and carrying rotatable ground wheels, said braces when aligned maintaining the ground wheels extended and supported on the ground, and
at least one actuator pivotally mounted on the tank to act at the hinged connection between said braces to raise the wheels from the ground.

2. Apparatus according to claim 1 wherein a tubular member rotatable about said transverse member carries the yoke thereon.

3. Apparatus according to claim 1 wherein said wheels are rotatably mounted on an outer end portion of the second brace member.

4. Apparatus according to claim 1 wherein said yoke is rotatable with a sleeve on said transverse member.

5. Apparatus according to claim 1 and further comprising beam members between the tank body and said longitudinal base members to support the tank of the members.

6. Apparatus according to claim 1 wherein said braces when retracted are disposed at a relative angle to each other to elevate the wheels to lower the tank to be supported by said I-beams.

7. Apparatus according to claim 1 wherein said actuators are double-acting with pressure on one piston side greater than pressure on the other side to prevent sudden force or movement causing possible collapse of the apparatus.

8. Apparatus according to claim 1 wherein a tubular member is rotatable about said transverse member and said yoke is mounted thereon.

9. Apparatus according to claim 1 wherein said at least one actuator is pivotally mounted at the front of the tank and is connected with the hinged connection to act thereon.

10. Apparatus according to claim 1 wherein two actuators have lower end portions pivoted on the rear of the tank with rods thereof extending to the pivotal connection between the braces.

11. A portable tank apparatus, comprising:
a tank body having a front, a rear and sides,
an elongate beam member disposed at each side of the tank body to support the tank body on the ground,
spaced-apart beam members extending between plural portions of the tank body and said longitudinal base members to support the tank on the base members,
a transverse member extending between front portions of said beam members,
a yoke rotatable relative to the transverse member for movement between a raised position and a lowered towing position,
a pair of hingedly connected brace members, one pivotally mounted on the tank and the other hingedly connected therewith and with a yoke for pivotal movement,
pivotal actuator means at the front of the tank to raise and lower the yoke by acting on the hinged connection between the brace members to move the yoke between a raised position and a lower position for towing of the tank,
a second pair of brace members having a hinged connection therebetween, one pivotally mounted at the upper rear of the tank and the other pivotally connected to the first and carrying rotatable ground wheels, said braces when aligned maintaining the ground wheels extended and supported on the ground, and
at least one actuator pivotally mounted on the tank to act at the hinged connection between said braces to raise the wheels from the ground.

12. Apparatus according to claim 11 wherein a tubular member rotatable about said transverse member carries the yoke thereon.

13. Apparatus according to claim 11 wherein said at least one actuator is pivotally mounted at the front of the tank and connected with the hinged joint to act on said hinge connection between the braces.

14. Apparatus according to claim 11 wherein said yoke is rotatable with a sleeve on said transverse member.

15. Apparatus according to claim 11 and further comprising heavy metal tubing extending about an upper opening of the tank for reinforcement.

16. Apparatus according to claim 11 wherein said braces when retracted are disposed at a relative angle to each other to elevate the wheels to lower the tank to be supported by said I-beams.

17. Apparatus according to claim 11 wherein said actuators are double-acting with pressure on one piston side greater than pressure on the other side to prevent sudden force or movement causing possible collapse of the apparatus.

18. Apparatus according to claim 11 wherein a tubular member is rotatable about said transverse member and said yoke is mounted thereon.

19. Apparatus according to claim 11 wherein two actuators have lower end portions pivoted on the rear of the tank with rods thereof extending to the pivotal connection between the braces.

20. A portable tank apparatus, comprising:
- a tank body having a front, a rear and sides,
- an elongate beam member disposed at each side of the tank body to support the tank body on the ground,
- a transverse member extending between front portions of said beam members,
- a yoke rotatable relative to the transverse member for movement between a raised position and a lowered towing position,
- a tubular member rotatable about said transverse member, said yoke being mounted thereon,
- a pair of hingedly connected brace members, one pivotally mounted on the tank and the other hingedly connected therewith and with a yoke for pivotal movement,
- pivotal actuator means at the front of the tank to raise and lower the yoke by acting on the hinged connection between the brace members to move the yoke between a raised position and a lower position for towing of the tank,
- a second pair of brace members having a hinged connection therebetween, one pivotally mounted at the upper rear of the tank and the other pivotally mounted to the first and carrying rotatable ground wheels, said braces when aligned maintaining the ground wheels extended and supported on the ground, and
- at least one actuator pivotally mounted on the tank to act at the hinged connection between said braces to raise the wheels from the ground.

21. Apparatus according to claim 20 wherein said at least one actuator is pivotally mounted at the front of the tank and connected with the hinged joint to act on said hinge connection between the braces.

22. Apparatus according to claim 20 wherein said yoke is rotatable with a sleeve on said transverse member.

23. Apparatus according to claim 20 and further comprising beam members between the tank body and said longitudinal base members to support the tank on the members.

24. Apparatus according to claim 20 and further comprising heavy metal tubing extending about an upper opening of the tank for reinforcement.

25. Apparatus according to claim 20 wherein said braces when retracted are disposed at a relative angle to each other to elevate the wheels to lower the tank to be supported by said I-beams.

26. Apparatus according to claim 20 wherein two actuators have lower end portions pivoted on the rear of the tank with rods thereof extending to the pivotal connection between the braces.

* * * * *